United States Patent
Ellinghuysen

(10) Patent No.: US 10,206,546 B1
(45) Date of Patent: *Feb. 19, 2019

(54) SELF-CONTAINED PORTABLE TOILET

(71) Applicant: Mark Ellinghuysen, Winona, MN (US)

(72) Inventor: Mark Ellinghuysen, Winona, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 15/935,517

(22) Filed: Mar. 26, 2018

(51) Int. Cl.
*A47K 11/02* (2006.01)
*A47K 13/00* (2006.01)

(52) U.S. Cl.
CPC ............ *A47K 11/02* (2013.01); *A47K 13/005* (2013.01)

(58) Field of Classification Search
CPC ........ A47K 11/02; A47K 11/04; A47K 11/06; A47K 11/08
See application file for complete search history.

(56) References Cited

U.S. PATENT DOCUMENTS

| | | | |
|---|---|---|---|
| 804,019 A | 11/1905 | Lotz | |
| 1,527,340 A * | 2/1925 | Wood | A47K 11/04 4/484 |
| 2,495,374 A | 1/1950 | Horn | |
| 2,974,321 A * | 3/1961 | Salka | A47K 11/04 190/1 |
| 3,097,016 A * | 7/1963 | Bigler, Jr. | A47C 5/005 297/440.12 |
| 3,600,719 A | 8/1971 | Karr | |
| 3,693,193 A | 9/1972 | May | |
| 3,723,999 A | 4/1973 | Miller | |
| 4,751,753 A | 6/1988 | Sargent et al. | |
| 5,048,130 A | 9/1991 | Brotman et al. | |
| D323,881 S | 2/1992 | Franey | |
| 5,265,285 A * | 11/1993 | Loebbert | A47K 11/04 4/484 |
| 5,779,306 A * | 7/1998 | Ohlsson | A47K 13/06 297/182 |
| 6,061,845 A * | 5/2000 | Kakutani | A47K 11/02 4/460 |
| 6,081,943 A | 7/2000 | Garcete | |
| 8,510,877 B2 | 8/2013 | Helewa | |
| 9,113,756 B2 | 8/2015 | Shaw | |
| 9,289,101 B2 | 3/2016 | Weir | |
| 9,867,512 B1* | 1/2018 | Ellinghuysen | A47K 13/005 |
| 2008/0022445 A1* | 1/2008 | Sell | A47K 11/06 4/484 |
| 2011/0258767 A1* | 10/2011 | Lok | A47K 11/06 4/483 |
| 2013/0227776 A1* | 9/2013 | Ito | A47K 11/02 4/479 |

* cited by examiner

*Primary Examiner* — Janie Loeppke
(74) *Attorney, Agent, or Firm* — Foley & Lardner LLP

(57) ABSTRACT

A portable toilet includes a base, a top cover hingedly disposed on the base, and an access door. The top cover has an opening that is alignable with a first cutout in a side wall of the base. In a storage position, the access door can be positioned to at least partially occlude the opening and the first cutout simultaneously. Furthermore, the access door may be configured to at least partially occupy a locating slot disposed on the top cover. The portable toilet may further include a support member that is hingedly disposed on the base. The support member may interface with the access door to prevent movement of the access door while in the storage position. When the top cover is in an in-use position, a removable toilet seat may be placed proximal an upper wall of the base and a surface of the top cover simultaneously.

20 Claims, 8 Drawing Sheets

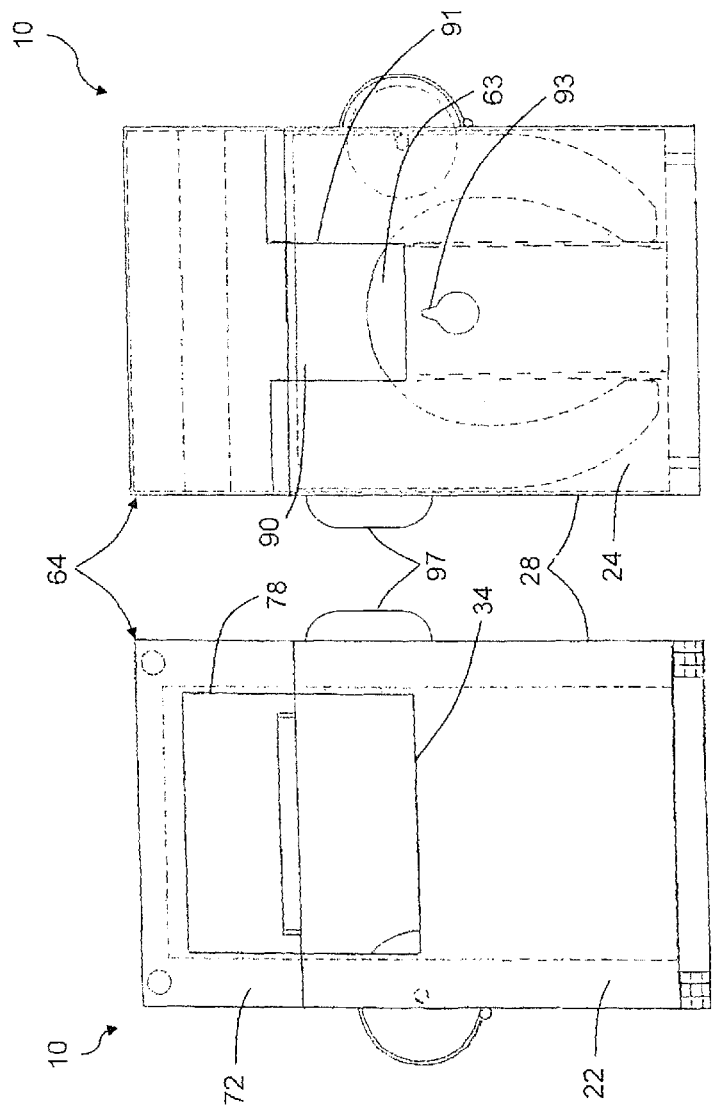

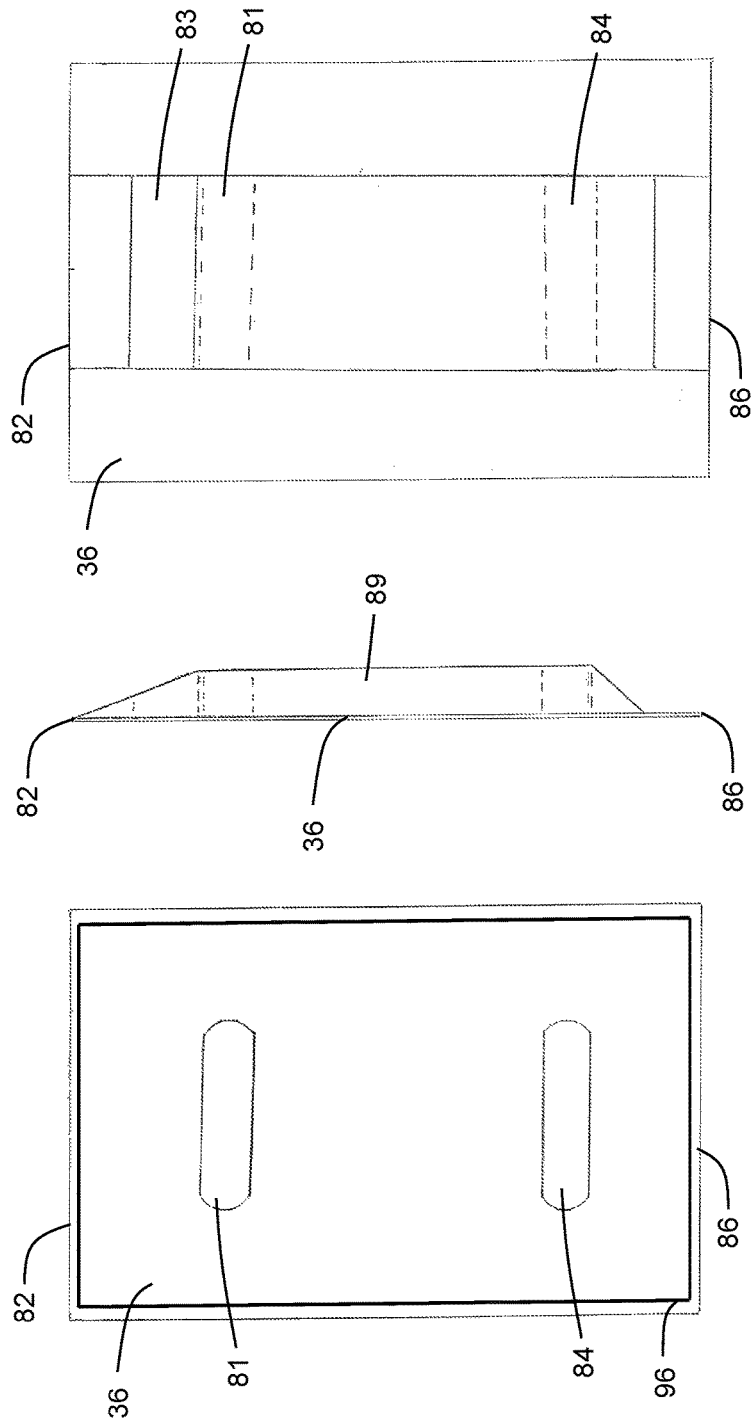

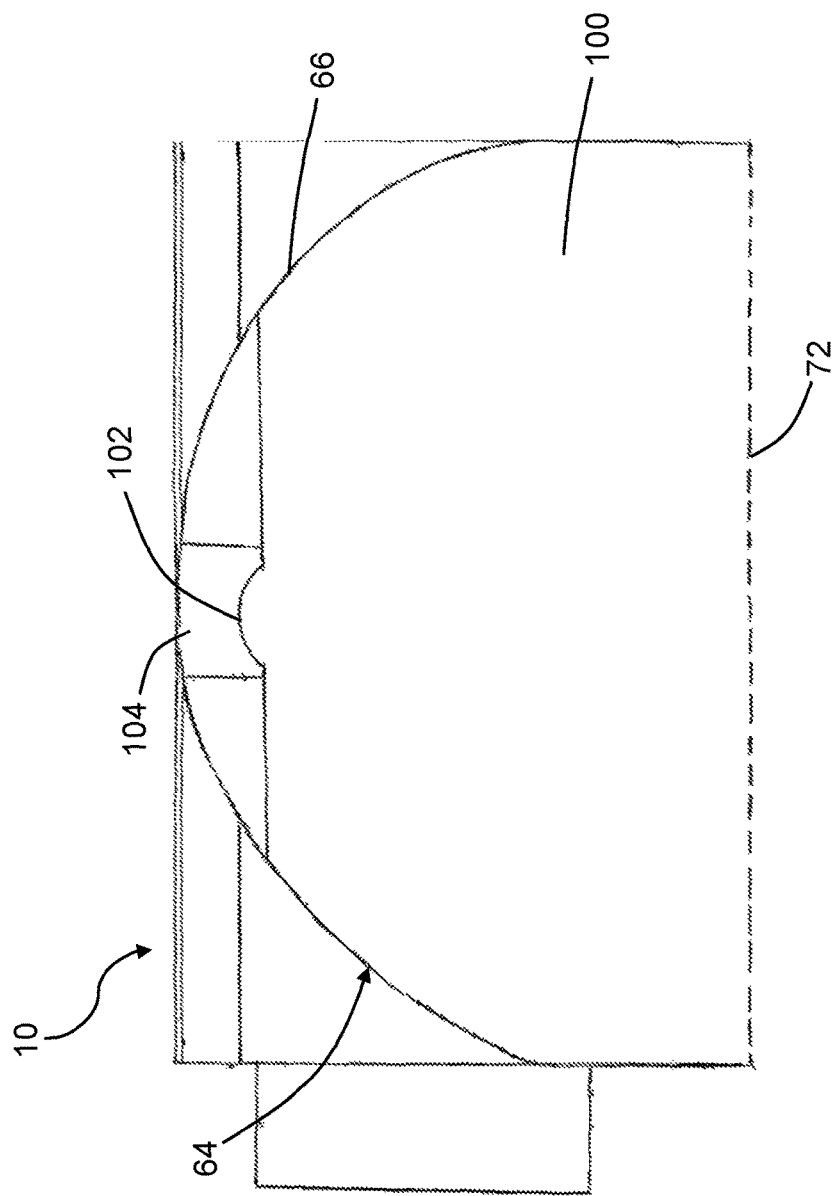

SELF-CONTAINED PORTABLE TOILET

TECHNOLOGY

The present technology is generally related to the field of portable toilets. More specifically, it is related to portable toilets that may contain odors and can be used in limited space situations.

SUMMARY

In one aspect, a portable toilet is provided that includes a base having a side wall, a lower wall, and an upper wall that together define a chamber within the base. In any of the above embodiments, a first cutout is disposed on the side wall and a second cutout is disposed on the upper wall. In any of the above embodiments, a top cover with an opening disposed thereon is hingedly disposed on the base. In any of the above embodiments, the top cover may have a storage position and an in-use position. In any of the above embodiments, the portable toilet is configured such that, in a storage position, a surface of the top cover is proximal the upper wall. In any of the above embodiments, the portable toilet may further include an access door disposed on the side wall. In any of the above embodiments, the access door is configured such that, in a storage position, it at least partially occludes the first portion of the cutout and the opening simultaneously.

In any of the above embodiments, the top cover may further include a locating slot disposed on a posterior wall. In any of the above embodiments, the access door is configured such that, in a storage position, it at least partially occupies the locating slot. In any of the above embodiments, the portable toilet may further include a support member hingedly disposed on the base with support legs therebetween, which is configured to stabilize the toilet while in an in-use position. In any of the above embodiments, a hanger may be included on the side wall to serve as an alternative means for securing the portable toilet. In any of the above embodiments, the support member may be configured such that, in the storage position, a surface of the support member is proximal the side wall resulting in a more compact footprint during certain operating modes. In any of the above embodiments, the support member may be further configured such that, in a storage position, the support member interfaces the access door to prevent movement of the access door. In any of the above embodiments, a latch disposed on the base may be utilized to secure the support member to the base in the storage position.

In any of the above embodiments, the portable toilet may further include a first recessed area disposed on the side wall, the first recessed area shaped for retaining a toilet paper roll. In any of the above embodiments, a bar may be removably disposed within the first recessed area to accommodate a roll of toilet paper, which may be at least partially shielded from the surroundings during periods of non-use by a toilet paper cover. In any of the above embodiments, the toilet paper cover may be configured to at least partially retract into at least one of the base and the first recessed area while the portable toilet is in-use. In any of the above embodiments, when the portable toilet is in a storage position, the support member may interface with the toilet paper cover to retain the toilet paper in the first recessed area.

In any of the above embodiments, the portable toilet may include a removeable toilet seat. In any of the above embodiments, when in-use, the removable toilet seat may be disposed proximal the upper wall of the base and a surface of the top cover simultaneously. In any of the above embodiments, at least a portion of the side wall may extend beyond the upper wall at the outer perimeter of the upper wall thereby forming a retaining lip for the removeable toilet seat. In any of the above embodiments, during periods of non-use, the removable toilet seat may be configured to be stored proximal to the side wall in a storage slot thereon. In any of the above embodiments, a second recessed area may be included in the top cover. In any of the above embodiments, an assembly cover may be hingedly disposed on the top cover and may be used to secure items contained within the second recessed area. In any of the above embodiments, the assembly cover may also serve as a handle that can be leveraged to position the top cover relative to the base. In any of the above embodiments, the second recessed area may be further configured to receive the support member to reduce the overall footprint of the device in certain operating modes.

In any of the above embodiments, the portable toilet may include a first seal and a second seal to prevent odors from emanating past the top cover and access door, respectively, while the portable toilet is in the storage position.

BRIEF DESCRIPTION OF THE DRAWINGS

FIG. 3 is a front view of the portable toilet of FIG. 1.

FIG. 4 is a rear view of the portable toilet of FIG. 1.

FIG. 8 is a front view of an access door for the portable toilet of FIG. 1.

FIG. 9 is a side view of the access door of FIG. 8.

FIG. 10 is a rear (interior) view of the access door of FIG. 8.

FIG. 11 is a top view of the portable toilet of FIG. 1 in the storage position.

DETAILED DESCRIPTION

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

Figure 1:
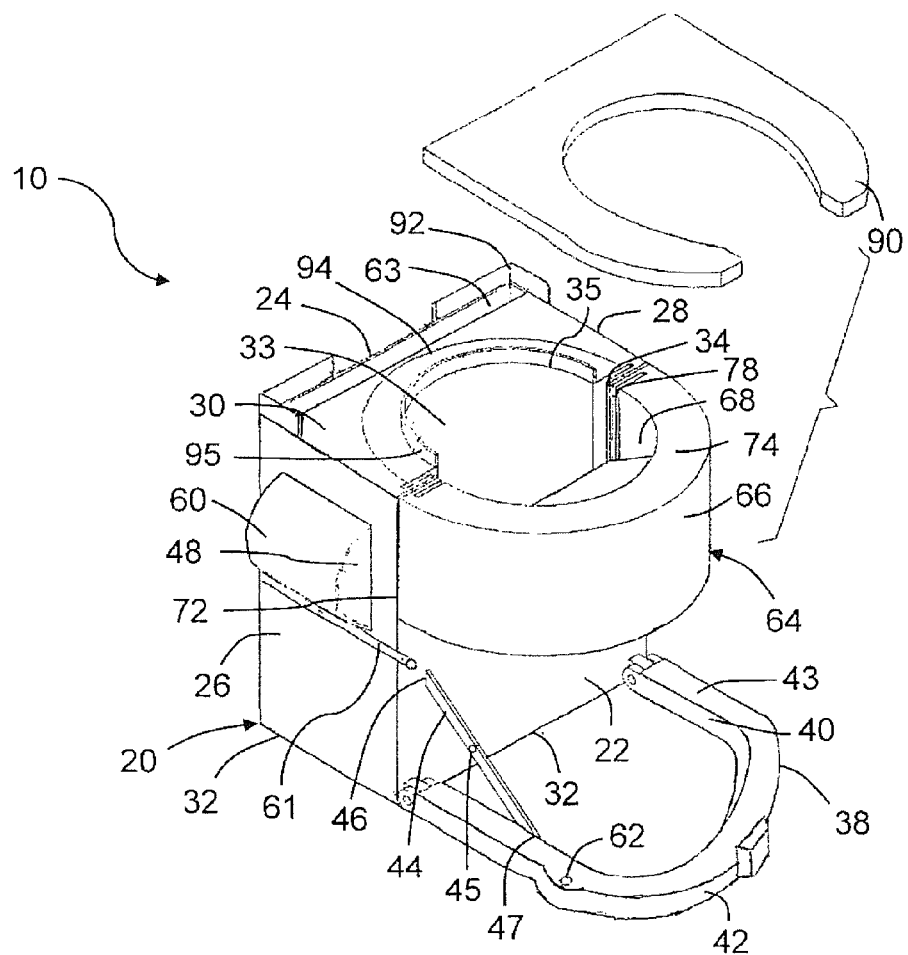
FIG. 1 is an exploded front isometric view of a portable toilet in an in-use position.
Figure 2:
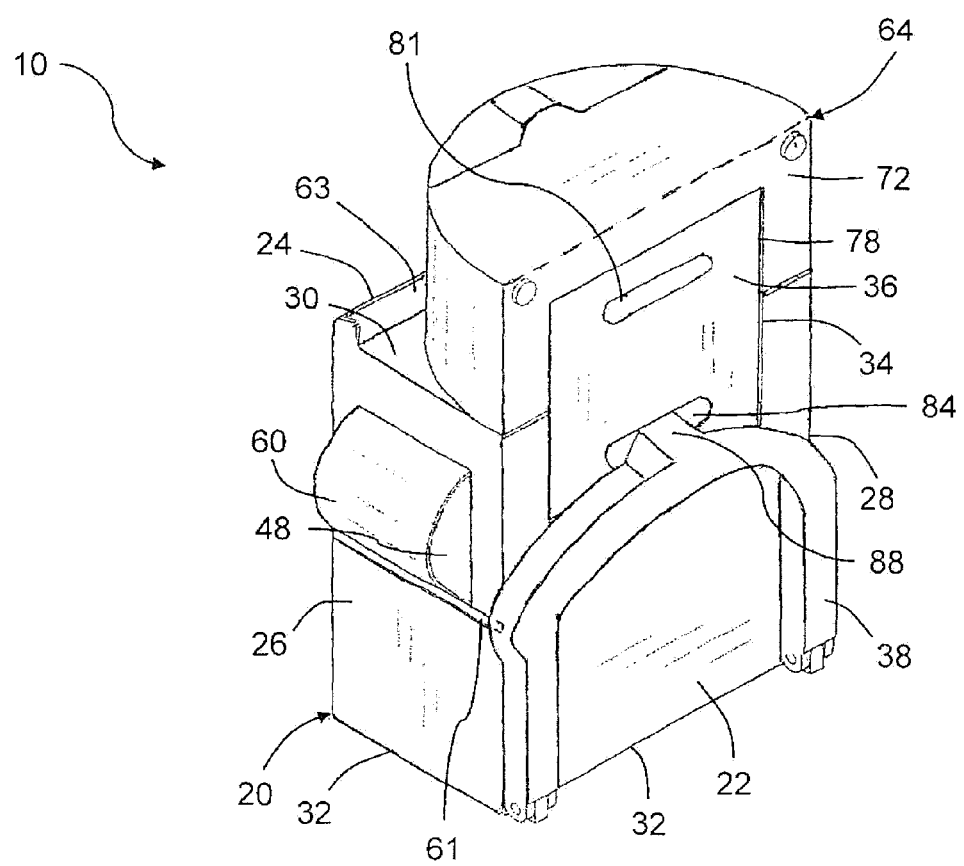
FIG. 2 is a rear isometric view of a portable toilet in a storage position.

Referring to the figures, FIG. 1 shows an embodiment of the portable toilet in an in-use position. FIG. 2 shows an embodiment of the portable toilet in a storage position, a configuration that may be utilized, for example, during periods of transport from one location to another. Referring to FIGS. 1 and 2, the portable toilet 10 includes a base 20 having side walls 22, 24, 26, 28, an upper wall 30, and a lower wall 32. Together, the side walls 22, 24, 26, 28, upper wall 30, and lower wall 32 define a chamber 33 within the base 20. As shown in FIGS. 2 and 3, a first cutout 34 is centrally disposed on side wall 22. The first cutout 34 is shown as a rectangular slot in the side wall 22, although a variety of other shapes may be utilized. As shown in FIG. 1, a second cutout 35 is centrally disposed on the upper wall 30. In this embodiment, the second cutout 35 is in the shape of a semicircle. The first cutout and the second cutout may intersect one another. An access door 36 (see FIG. 2) is disposed on the side wall 22 within the first cutout 34. A support member 38 is hingedly disposed on the side wall 22 proximal the lower wall 32. When in-use, the support member 38 may be rotated away from the side wall 22, as shown in FIG. 1. In this configuration, a user's heels may be placed upon the top surface 43 of the support member 38 to stabilize the portable toilet 10.

Figure 6:
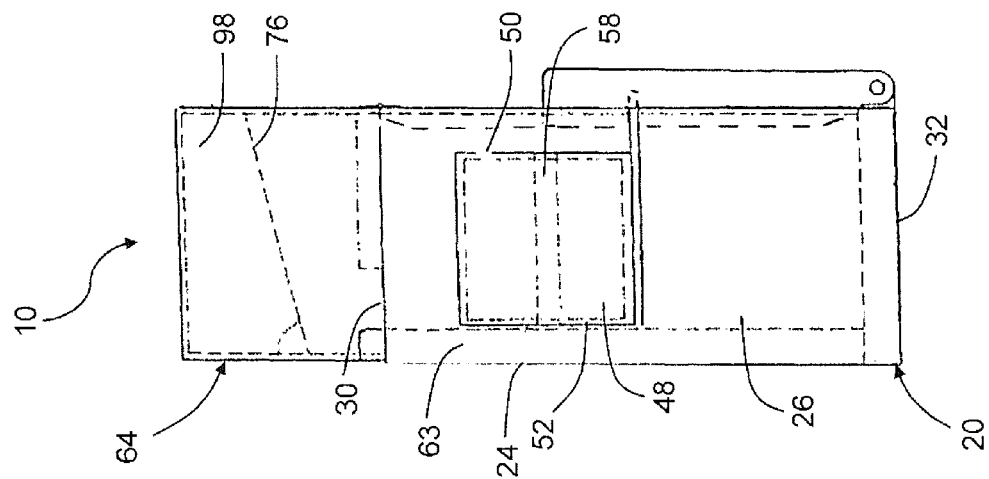
FIG. 6 is a right side view of the portable toilet of FIG. 1 without a support leg and with the portable toilet in the storage position.
Figure 5:
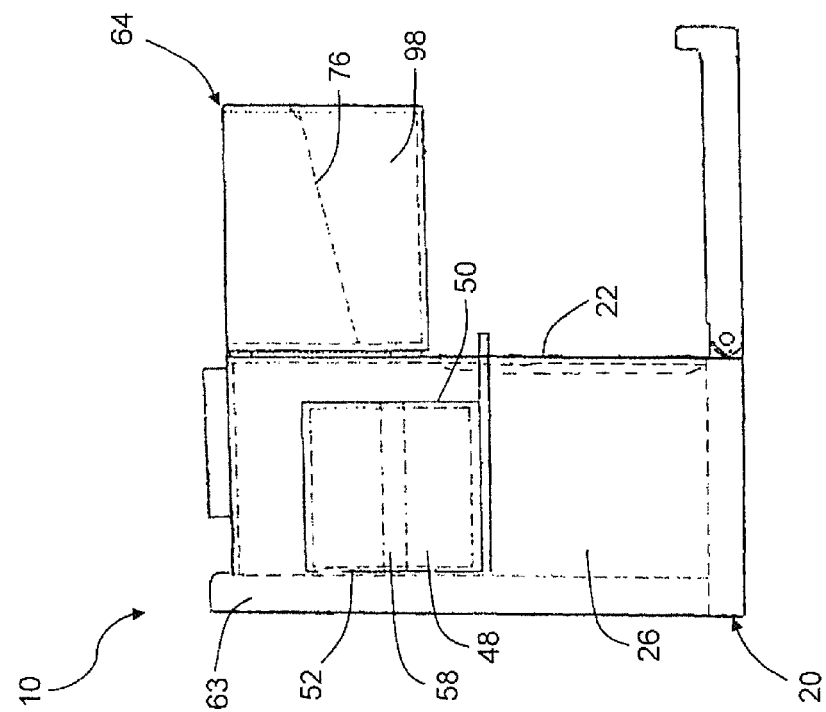
FIG. 5 is a right side view of the portable toilet of FIG. 1 without a support leg and with the portable toilet in the in-use position.

The support member 38 shown in FIG. 1 is further supported by a support leg 44. The support leg 44 provides additional stability to the portable toilet 10. The support leg 44 shown in FIG. 1 is collapsible about a central hinge 45, which facilitates retracting the support member 38 when reconfiguring the portable toilet 10 from the in-use position (as shown in FIG. 1) to the storage position (as shown in FIG. 2). As shown in FIG. 1, the support leg 44 includes a first end 46 and a second end 47. The first end 46 is attached centrally to the side wall 22, between the upper wall 30 and lower wall 32. A second end 47 of the support leg 44 is attached to an interior edge 40 of the support member 38. Alternatively, the second end 47 may be attached to an exterior edge 42 of the support member 38 or onto any surface of the support member 38 that would allow the support member 38 to fully retract onto the side wall 22 in the storage position (according to the configuration shown in FIG. 2). Note that the support leg 44 is not required to stabilize the Referring again to FIGS. 1 and 2, a first recessed area 48 is disposed on the side wall 26. Specifically, the first recessed area 48 is centered between side wall 22 and side wall 24, although the first recessed area 48 may be located at any suitable location along the side wall 26. In the embodiments of FIGS. 1 and 2, the first recessed area 48 is shaped to accommodate a roll of toilet paper. A side view of the portable toilet 10 in the in-use and storage positions is shown in FIGS. 5 and 6, respectively. As shown in FIGS. 5 and 6, a bar 58 is removably and centrally disposed within the first recessed area 48. The bar 58 is oriented in a direction parallel to side wall 26 and extends from the rearward edge 52 to the forward edge 50. As shown in FIGS. 1 and 2, a toilet paper cover 60 is disposed directly over the first recessed area 48. The toilet paper cover 60 may be hingedly disposed on the base 20 or retractable into the first recessed area 48 or base 20. The support member 38 may be configured to interface with the toilet paper cover 60 to prevent movement of the toilet paper cover 60 in the storage position. In the embodiment shown in FIGS. 1 and 2, the toilet paper cover 60 includes an extension piece 61 that is configured to interface with a locking hole 62 (shown in FIG. 1) on the support member 38 when the portable toilet 10 is in the storage position. This interface secures the toilet paper cover 60 in position, thereby preventing any items stored within the first recessed area 48 from falling out during periods of storage or transport. The extension piece 61 shown in FIGS. 1 and 2 takes the form of a rod that extends toward side wall 22 in a direction that is parallel to side wall 26. A variety of alternative locking features may be used; for example, the support member 38 and toilet paper cover 60 could clip together or utilize any other suitable fastening means. Alternatively, a separate clip or fastener may be used to secure the toilet paper cover 60 to the base 20 while in a storage position.

As shown in FIGS. 1, 5, and 6, a storage slot 63 is centrally disposed on the base 20 proximal the side wall 24. As shown in FIGS. 5 and 6, the storage slot 63 extends from the upper wall 30 to the lower wall 32 in a direction that is parallel to the side wall 24.

Referring again to FIGS. 1 and 2, a top cover 64 is hingedly disposed on the upper wall 30 of the base 20 proximal the side wall 22. As shown in FIG. 1, the top cover 64 may include a convex exterior wall 66, a convex interior wall 68, a flat lip 74, and a flat posterior wall 72 (see FIG. 2). The lip 74 extends between the convex exterior wall 66 and the convex interior wall 68 and is co-planar with the upper wall 30 when the portable toilet 10 is configured in the in-use position. Note that a variety of alternative shapes may be used to comfortably accommodate a user while the portable toilet 10 is in the in-use position. In the in-use position, the flat posterior wall 72 is proximal to side wall 22. In the storage position, as shown in FIG. 2, the lip 74 is proximal to the upper wall 30.

As shown in FIGS. 2 and 3, the top cover 64 includes an opening 78 centered on the posterior wall 72 that is alignable with the first cutout 34. In the in-use position, as shown in FIG. 1, the first cutout 34 along the side wall 22 matches up with the opening 78. As shown in FIGS. 1, 5, and 6, the top cover 64 may also include an angled surface 76 extending from the convex interior wall 68 (as shown in FIG. 1) proximal the side wall 22 to the convex interior wall 68 proximal the lip 74 (as shown in FIG. 1).

Figure 7:
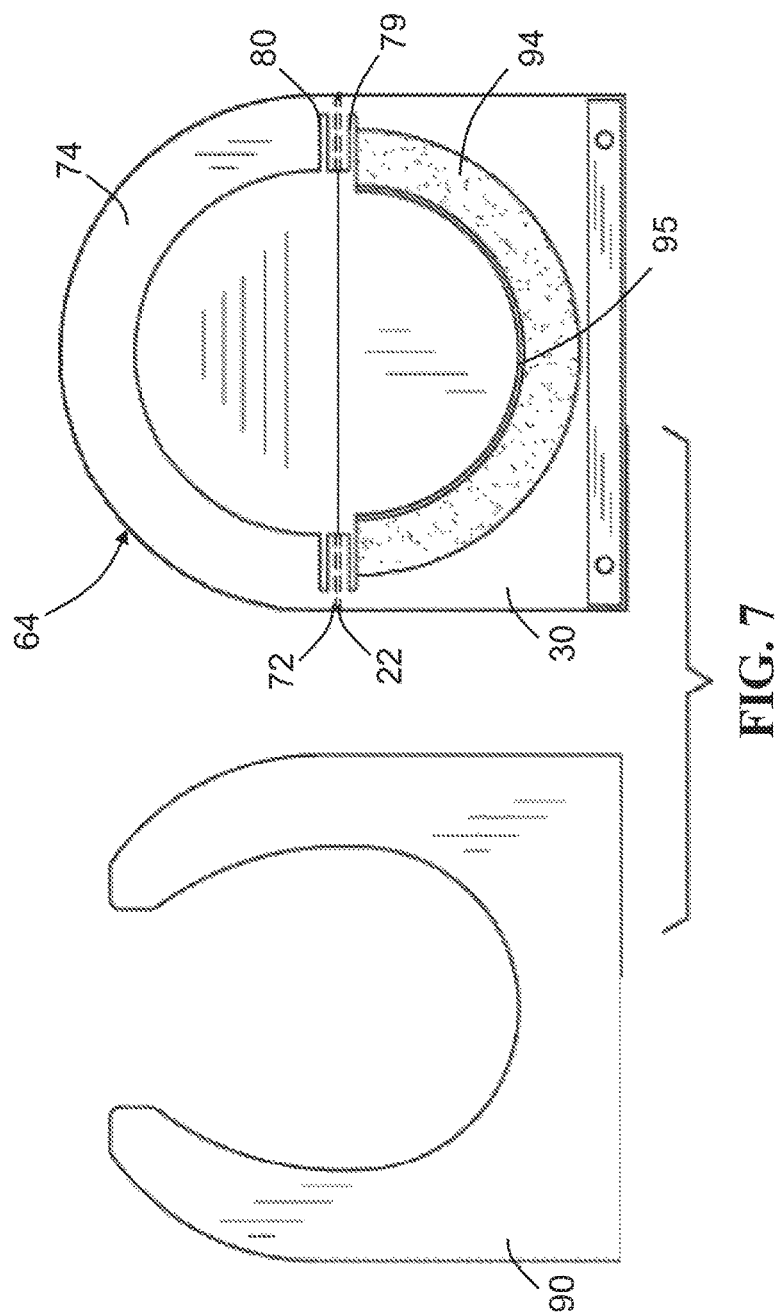
FIG. 7 is a top view of the portable toilet of FIG. 1 in the in-use position.

The access door 36 has an open position and an alternate closed position. As shown in FIG. 2, when the portable toilet 10 is in a storage position the access door 36 is in the closed position. In the storage position, the access door 36 is disposed within the first cutout 34 and the opening 78 such that the access door 36 at least partially occludes the first cutout 34 and the opening 78 simultaneously. The access door 36 may be configured to slide along a track or slide slot 79 disposed in the base 20 as shown in FIG. 7. In the embodiment shown in FIG. 7, the slide slot 79 is disposed in side wall 22. In the storage position, the access door 36 (see FIG. 2) may be received within a locating slot 80 in the top cover 64 to secure the top cover 64 in the storage position. In the embodiment of FIG. 7, the locating slot 80 is disposed on the posterior wall 72 and extends in a direction parallel to the posterior wall 72. The locating slot 80 is alignable with slide slot 79 in the in-use position.

As shown in FIGS. 2, 8, and 10, the access door 36 may include an upper handle 81 that takes the form of an elongated slot centrally located on the access door 36 proximal the upper edge 82 of the access door 36. Suitable alternatives to the upper handle 81 include a knob (not shown), which would improve sealing of the chamber 33 (see FIG. 1) in the storage position. The access door 36 may further include a handle support 83 located on an interior side of the access door 36, which provides an ergonomic user interface. As shown in FIGS. 2, 8, and 10 the access door 36 may further include a locking slot 84. The locking slot 84 may also take the form of an elongated slot, centrally located on the access door 36 but proximal the lower edge 86 of the access door 36. As shown in FIG. 2, in the storage position the support member 38 interfaces with the locking slot 84 to prevent movement of the access door 36. Specifically, in the embodiment shown in FIG. 2, a small extension 88 disposed on the support member 38 may be inserted into the locking slot 84. The small extension 88 may be slightly oversized to lock into the access door 36 in the storage position. Alternatively, a separate latch on the base 20 may be included to secure the support member 38 to the base 20 in the storage position; for example, a draw latch or other quick-latch mechanism 65 (see FIG. 11). As shown in FIG. 9, the access door 36 may also include a support rib 89. In the embodiment of FIG. 9, the access door 36 includes two support ribs 89 oriented perpendicular to upper edge 82 and lower edge 86.

As shown in FIG. 1, the portable toilet 10 may further include a removeable toilet seat 90. As shown in FIG. 7, an embodiment of the removeable toilet seat 90 is a single piece of material that rests proximal both the upper wall 30 and the lip 74 simultaneously in the in-use position. As shown in FIG. 1, a portion of side walls 24, 26, and 28 extend beyond the upper wall 30 at the outer perimeter of the upper wall 30 such that they form a retaining lip 92 at the outer perimeter of the upper wall 30. This retaining lip 92 secures the removeable toilet seat 90 while the portable toilet 10 is configured in the in-use position. As an alternative to the retaining lip 92, the removeable toilet seat 90 may include a set of holes that align with one or more pins or extrusions in the upper wall 30 or top cover 64.

As shown in FIG. 4, in the storage position the removeable toilet seat 90 can be housed within the storage slot 63. A cutaway 91 in the side wall 24 located central to the side wall 24 and proximal the upper wall 30 may be included to assist with removal of the removeable toilet seat 90 from the storage slot 63. Side wall 24 may also include a hanger 93 or eyelet, which provides an alternate support mechanism for the portable toilet 10 when in-use. For example, the hanger 93 shown in FIG. 4 is suitable for mounting the portable toilet 10 to a tree, tree stand, or any surface incorporating a suitable mounting feature. In the embodiment shown in FIG. 4, the hanger 93 is centered on the side wall 24. FIGS. 3 and 4 also show a handle 97 that may be used to transport the portable toilet in the storage position. In FIGS. 3 and 4, the handle 97 is disposed on the side wall 28 proximal the upper wall 30, which prevents the portable toilet 10 from completely tipping over during transport. Alternatively, the handle 97 could be located on the top cover 64 or any position suitable for ease-of-transport.

As shown in FIGS. 1 and 7, the portable toilet 10 may further include a first seal 94 disposed on at least one of the upper wall 30 and top cover 64. The first seal 94 may be in the shape of a semicircle with a small sealing lip 95 to prevent any fluid from leaking between the removeable toilet seat 90 and the upper wall 30. The first seal 94 may also support a bag within the chamber 33 that may be used to prevent contaminants from contacting surfaces of the chamber 33. Specifically, the bag could be sandwiched in between the removeable toilet seat 90 and the first seal 94. In the storage position, the first seal 94 contacts the top cover and the upper wall simultaneously to prevent unpleasant odors from escaping the chamber 33. The portable toilet 10 may also include a second seal 96 disposed on either the access door 36 or on both the base 20 and the top cover 64. With the portable toilet 10 in the storage position, the second seal 96 contacts the access door 36, top cover 64, and the base 20 simultaneously. In the embodiment shown in FIG. 8, the second seal is located on the access door 36 proximal the outer perimeter of the access door 36 and completely surrounds the upper handle 81 and locking slot 84. The first seal 94 and the second seal 96 may be made from a variety of materials, including rubbers such as neoprene or nitrile.

Figure 12:
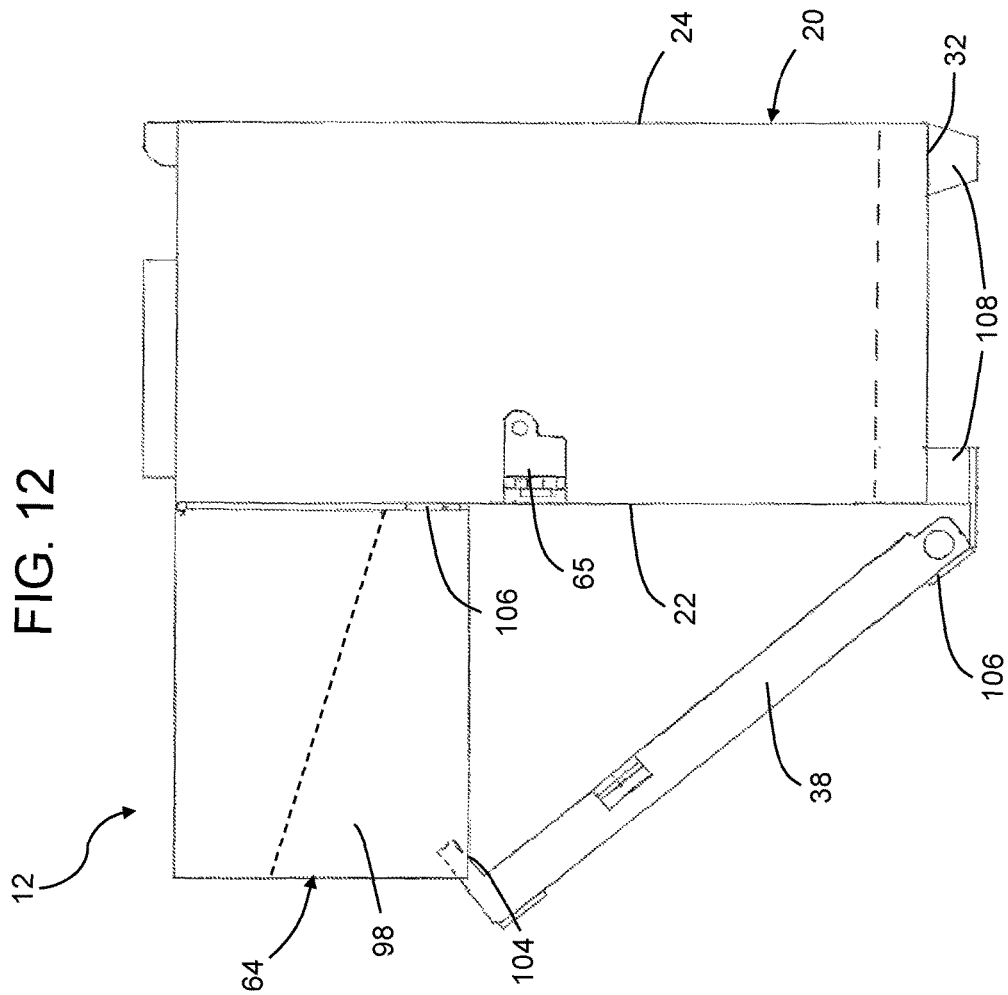
FIG. 12 is a side view of a portable toilet in an in-use position.

Referring now to FIGS. 5 and 6, the portable toilet 10 includes a second recessed area 98 disposed in the top cover 64. FIG. 11 shows a top view of the portable toilet 10 in the storage position. As shown in FIG. 11, the top cover 64 further includes an assembly cover 100 that is hingedly disposed on the top cover 64 proximal the posterior wall 72. The assembly cover 100 occludes at least a portion of the second recessed area 98 (see FIGS. 5 and 6) in the storage position. The assembly cover 100 may further include an assembly handle 102 centered on the assembly cover 100 proximal the convex exterior wall 66. Among other functions, the assembly handle 102 facilitates repositioning of the top cover 64 during assembly. For example, the assembly handle 102 may be used to reposition the top cover 64 from the storage position to the in-use position. As shown in FIG. 11, a portion 104 of the second recessed area 98 is exposed in between the assembly handle 102 and the convex exterior wall 66. As shown in FIG. 12, the support member 38 is engageable to this portion 104 of the second recessed area 98 in an alternate in-use configuration.

The embodiment of the portable toilet 12 shown in FIG. 12 differs slightly from the embodiments of FIGS. 1 and 2. In FIG. 12 the portable toilet 12 further includes support pads 106 for the top cover 64 and support member 38, as well as mounting posts 108 for the portable toilet, which may improve stability during use of the portable toilet 12 on uneven surfaces. In the embodiment of FIG. 12, the mounting posts 108 are disposed on the lower wall 32 proximal side walls 22 and 24.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of will be understood to include those elements specifically recited and those additional elements that do not materially affect the basic and novel characteristics of the claimed technology. The phrase" consisting of excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

Other embodiments are set forth in the following claims.

What is claimed is:

1. A portable toilet comprising:
    a base having a side wall, a lower wall, and an upper wall that together define a chamber within the base;
    a first cutout disposed on the side wall;
    a second cutout disposed on the upper wall;
    a top cover hingedly disposed on the base proximal the upper wall, the top cover having a storage position and an alternate in-use position, wherein in the storage position a surface of the top cover is proximal the upper wall;
    an opening disposed on the top cover and alignable with the first cutout; and
    an access door disposed on the side wall;
    wherein:
        in the storage position the access door is configured to at least partially occlude the first cutout and the opening simultaneously.

2. The portable toilet of claim 1, the top cover further comprising a posterior wall and a locating slot disposed on the posterior wall, wherein in the storage position the access door is configured to at least partially occupy the locating slot.

3. The portable toilet of claim 1 further comprising a support member hingedly disposed on the base proximal the lower wall.

4. The portable toilet of claim 3, wherein in the storage position a surface of the support member is proximal the side wall.

5. The portable toilet of claim 3, wherein in the storage position the support member is configured to interface the access door to prevent movement of the access door.

6. The portable toilet of claim 3, further comprising a support leg having a first end and a second end, wherein the first end is attached to the side wall and the second end is attached to the support member.

7. The portable toilet of claim 3 further comprising a latch disposed on the base that secures the support member to the base in the storage position.

8. The portable toilet of claim 1, the base further comprising a first recessed area disposed on the side wall, wherein the first recessed area is shaped for retaining a toilet paper roll, and a bar, wherein the bar is removably disposed within the first recessed area.

9. The portable toilet of claim 8 further comprising a toilet paper cover, wherein the toilet paper cover at least partially covers the first recessed area in at least one position.

10. The portable toilet of claim 9 further comprising a support member hingedly disposed on the base proximal the lower wall, wherein in the storage position the support member is configured to interface with the toilet paper cover to prevent movement of the toilet paper cover.

11. The portable toilet of claim 9, wherein the toilet paper cover at least partially retracts into at least one of the base and the first recessed area.

12. The portable toilet of claim 1 further comprising a removable toilet seat, wherein in the in-use position the removable toilet seat is disposed proximal the upper wall and a surface of the top cover simultaneously.

13. The portable toilet of claim 12, wherein at least a portion of the side wall extends beyond the upper wall at the outer perimeter of the upper wall and forms a retaining lip at the outer perimeter of the upper wall.

14. The portable toilet of claim 3 further comprising a locking slot disposed on the access door and a small extension disposed on the support member, wherein the small extension is engageable to the locking slot.

15. The portable toilet of claim 1, the base further comprising a storage slot disposed proximal the side wall, wherein the storage slot extends in a direction parallel to the side wall.

16. The portable toilet of claim 1 further comprising a second recessed area disposed on the top cover and an assembly cover hingedly disposed on the top cover, wherein the assembly cover is configured to occlude at least a portion of the second recessed area.

17. The portable toilet of claim 16 further comprising a support member hingedly disposed on the base proximal the lower wall, wherein the support member is engageable to at least a portion of the second recessed area.

18. The portable toilet of claim 1 further comprising a first seal disposed on at least one of the upper wall and top cover, wherein in the storage position the first seal is configured to contact the top cover and upper wall simultaneously.

19. The portable toilet of claim 1 further comprising a second seal disposed on either the access door or on both the base and the top cover, wherein in the storage position the second seal is configured to contact the access door, the base, and the top cover simultaneously.

20. The portable toilet of claim 1 further comprising a hanger disposed on the side wall.

\* \* \* \* \*